Patented Feb. 3, 1925.

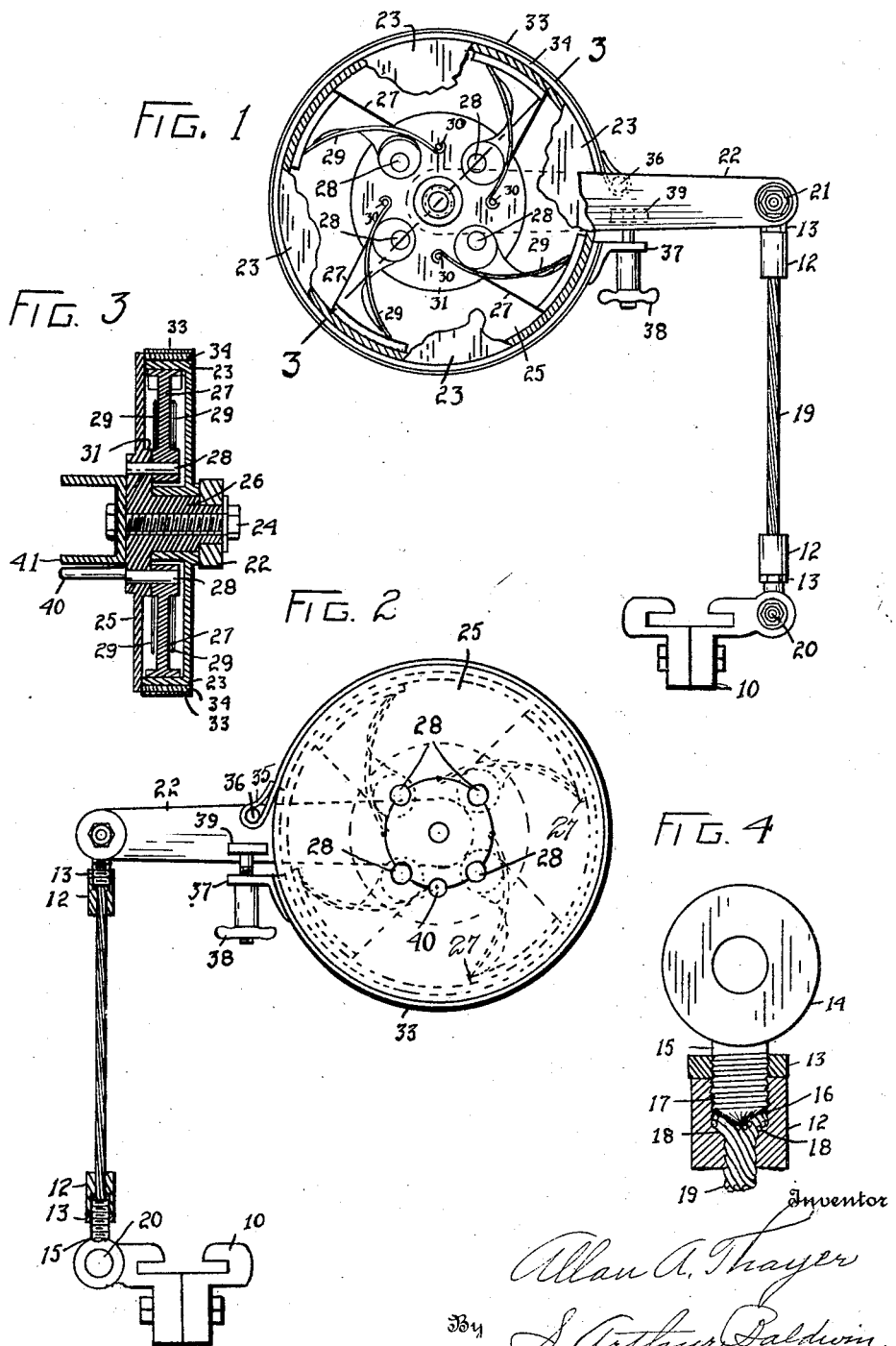

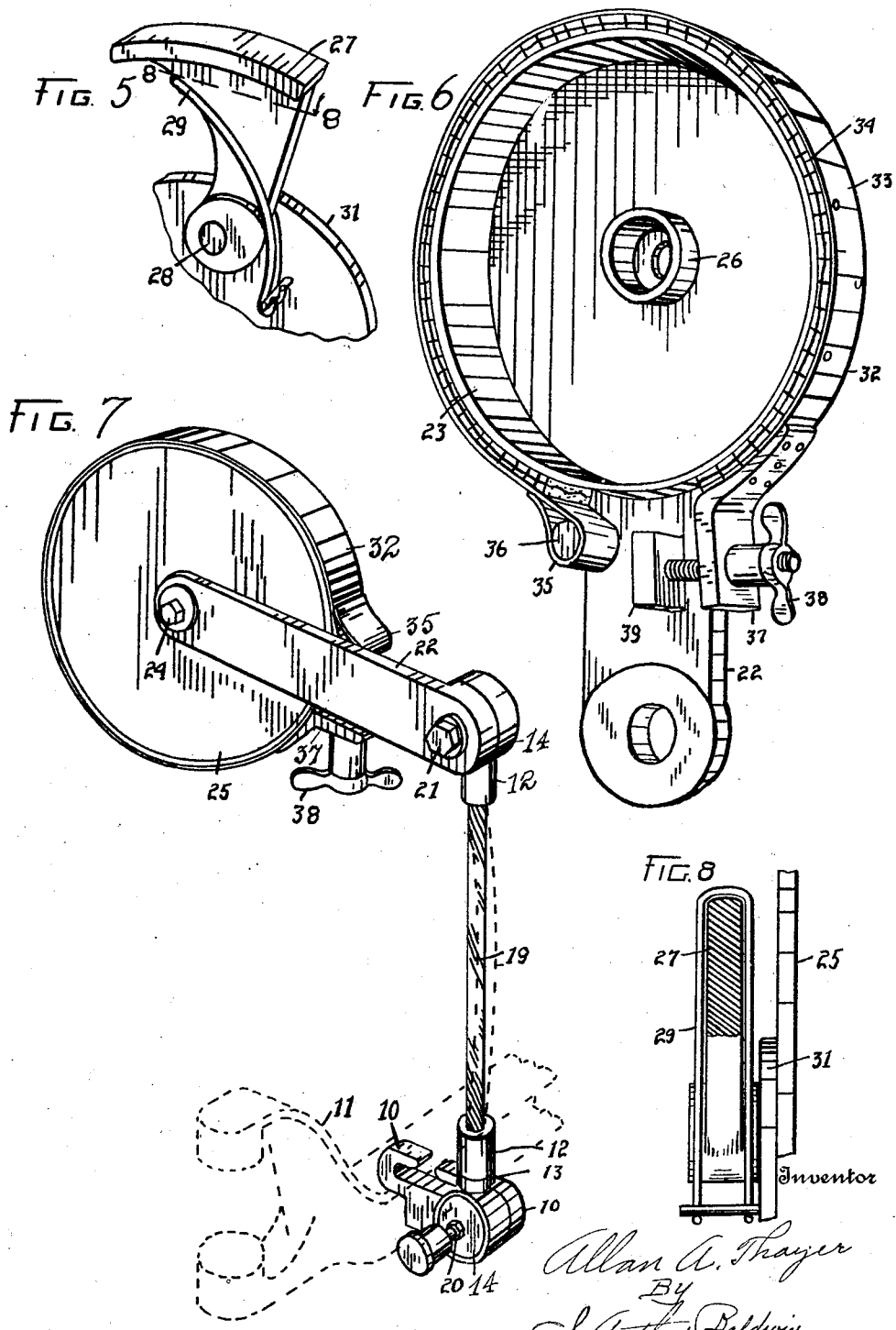

1,525,157

UNITED STATES PATENT OFFICE.

ALLAN A. THAYER, OF JAMESTOWN, NEW YORK, ASSIGNOR TO AUTO SPRING CONTROL COMPANY, OF JAMESTOWN, NEW YORK, A CORPORATION OF NEW YORK.

CONTROL FOR VEHICLE SPRINGS.

Application filed December 6, 1920. Serial No. 428,571.

*To all whom it may concern:*

Be it known that I, ALLAN A. THAYER, a citizen of the United States, residing at the city of Jamestown, in the county of Chautauqua and State of New York, have invented certain new and useful Improvements in Controls for Vehicle Springs, of which the following, taken in connection with the accompanying drawings, is a specification.

The invention relates to spring control for vehicles, self-propelled or otherwise; and the object of the improvement is to provide a combination clutch and brake control whereby the upward throw or recoil of the spring is overcome, and the connection between said clutch-brake control and the axle of the vehicle is also made pliable or flexible so as to accommodate any side swing or movement of the vehicle body; and the invention consists in the novel features and combinations hereinafter set forth and claimed.

In the drawings, Figures 1 is an elevation of the combination brake-clutch control for the vehicle springs, the front portion of the drum being broken away to show the cam ended clutching dogs in position on the stationary closure plate for the brake and clutch drum; and Fig. 2 is a similar elevation of the rear side of the same. Fig. 3 is a diametral sectional view at line 3—3 in Fig. 1 showing the construction and arrangement of the combination clutch-brake. Fig. 4 is a sectional view of the preferred form of joint for fastening the end of the wire cable in the holding sleeve. Fig. 5 is an elevation of one of the cam ended spring clutching dogs showing the bridle-spring support for the same. Fig. 6 is a perspective view of the inner side of the clutch-brake drum showing the brake band around the same. Fig. 7 is a perspective view of the front side of the combination clutch-brake spring control showing the preferred arrangement for the same and attachment to the axle, the axle being shown in dotted outline and the side bend of the flexible cable connection being also shown in dotted outline. Fig. 8 is a sectional view of one of the clutching dogs at line 8—8 in Fig. 5 showing the bridle-spring support for the same and the rear supporting closure plate for the drum.

Like characters of reference refer to corresponding parts in the several views.

The numeral 10 designates the clamping holding bracket by which attachment is made to the axle 11.

The holding bracket 10 has the socket sleeve 12 attached thereon by means of the nut 13, ring piece 14 with its threaded projecting lug 15, which lug is preferably pointed as shown at 16 in Fig. 4. The socket 17 in the sleeve 12 is preferably contracted at the same angle as the point 16 as shown at 18 in Fig. 4. The threaded lug 15 is screwed into the socket sleeve 12 and into the end of the wire cable or rope 19, pressing the ends of the wires out in all directions as shown in section in said Fig. 4, and thereby wedging said wires against the inclined surface 18 around the inner opening in the socket sleeve 12. The socket sleeve 12 is locked in position by means of the lock nut 13 which thereby fastens the sleeve 12 and ring piece 14 firmly upon the end of the wire cable 19.

The ring piece 14 is attached by suitable screw bolts 20 at the lower end preferably directly to the holding bracket 10 and at the upper end by the bolt 21 to the outer end of the actuating lever 22, which extends to the center of the brake-clutch drum 23, receiving the bolt 24 therethrough, which bolt 24 not only holds the entire clutch-drum mechanism together, but also attaches said clutch-drum to the frame 41. The pin 40 in the plate 25 extends beneath the frame 41, thereby holding said plate 25 stationary and allowing the clutch-drum 23 to rotatably move around the same.

The bolt 24 is screwed into and extends through the central portion of the closure plate 25, which plate has the shaft 26 preferably integral therewith and upon which plate 25 the clutching dogs 27 are pivotally assembled by means of the pins 28 through the inner hinging point or pivot of the same, each of the dogs 27 being pivotally mounted on said pins 28 and fitting within the drum 23 so as to be turned into radial clutching contact against the inner periphery of said drum 23 when the body is moved upward by the recoil or upward throw of the vehicle spring, yet leaving the springs free to move downward with full resiliency.

In order that the clutching dogs 27 may always be in correct position for instant clutching contact against the inner periphery of the drum 23, a spring 29 is provided which is preferably in the bridle form, extending around the thinner portion of the dog 27 and engaging beneath the shoe portion of said dog to hold its bearing portion closely adjacent to said inner periphery of said drum 23, the two ends of the spring 29 being hooked around the pin 30 in the central raised portion 31 of the closure plate 25, one pin 30 to each of the springs 29. This arrangement of the springs gives a strong leaf spring control for the dogs 27 which holds them always in position, yet is easy of assemblage. This method of construction permits the dogs 27 with springs 29 being assembled either right or left as may be desired, since all that is necessary is to turn or reverse them in the opposite direction, attaching the hooked ends of the springs 29 beneath the adjacent pin 30 opposite the straight side of the dog 27.

The retarding movement in this combined brake and clutch control for the vehicle spring is attained by means of a brake band 32 which extends around the outer periphery of the drum 23 preferably being composed of an outer steel band 33 and an inner woven or fibrous brake band 34 which slips upon said outer periphery of the drum 23. The end 35 of said metallic band 33 is preferably attached to a pin 36 on the inner side of the lever 22 as shown in Fig. 6, while the opposite end has the lug 37 attached thereto, and a thumb screw 38 extending through said lug 37 is attached in the lug 39 which in turn is attached to the inner side of the lever 22, the lug 37 being preferably parallel to said lug 39 so that by turning the thumb nut 38, any desired tension can be given to the brake band 32 upon the outer periphery of the drum 23.

In order to operate the spring control, it is apparent that the lever 22 is perfectly free to allow the body of the vehicle upon the springs to move downward when the dogs 27 are not in clutching or holding engagement with the inner periphery of the drum 23, but the instant that said vehicle body starts to move upward from the recoil of the springs, the movement of the actuating lever 22 causes the dogs 27 to move into clutching radial position against the inner periphery of the drum 23, thereby fixedly holding said drum and permitting the brake band 32 to slip around said brake drum, the adjustment of the tension of said brake band being such that the slippage of the same gives the desired retarding movement to the upward throw or recoil of the vehicle spring and consequently holds said vehicle springs and body under the desired control.

The wire cable links 19 permit the sidewise swaying movement of the vehicle body without in any wise impairing said cable link connection, yet said cable connection is sufficiently stiff to attain the purpose of moving the lever 22 as desired in either direction, upward or downward, thereby far better fulfilling the purpose of the link connection between the lever 22 and the axle clip or clamping bracket 10 than with a stiff link. Said cable link is also easily assembled and of low cost. The length also can be easily adjusted as desired.

What is claimed is:

1. A control for vehicle springs comprising a rotatable drum, a closure plate for one side of said drum fixedly attached to the frame of the vehicle, clutch mechanism including cam-ended dogs pivotally attached on said fixed plate and shaped to be drawn into frictional engagement against the inner periphery of said rotatable drum when moved by the recoil of the vehicle springs yet permit free movement in the opposite direction, and bridle-shaped springs to hold said dogs in contacting relation against the inner periphery of said rotatable drum, an actuating lever for said clutch mechanism, a brake band around said drum adjustably attached to said lever, and a flexible link connection between said actuating lever and the axle of the vehicle.

2. In control mechanism for vehicle springs, a plate, having a hub, a drum rotatable on the hub, a lever mounted on the hub, a bolt extending through the lever and hub and into a part of a vehicle for holding all of said parts in their assembled relation and to secure same to the vehicle, spring tensioned clutch dogs pivoted to the plate and having parts formed for frictional engagement with the inner circumference of the drum, a brake band frictionably engaging about the periphery of the drum and connected at its ends to the lever, and a flexible cable connected to the lever and formed for attachment to the vehicle axle.

3. In control mechanism for vehicle springs, a plate having a hub, a drum rotatable on the hub, a lever mounted on the hub, a bolt extending through the lever and hub and into a part of a vehicle for holding all of said parts in their assembled relation and to secure same to the vehicle, spring tensioned clutch dogs pivoted to the plate and having parts formed for frictional engagement with the inner circumference of the drum, a brake band frictionally engaging about the periphery of the drum and connected at its ends to the lever, and means to connect the lever to the vehicle axle.

In testimony whereof I have affixed my signature in the presence of two witnesses.

ALLAN A. THAYER.

Witnesses:
C. V. SWANSON,
THEO. T. HAAG.